US010393989B2

(12) United States Patent
Turner et al.

(10) Patent No.: US 10,393,989 B2
(45) Date of Patent: Aug. 27, 2019

(54) MANUAL FOCUS CONTROL DEVICE

(71) Applicant: The Vitec Group PLC, Richmond (GB)

(72) Inventors: Steve Turner, Richmond (GB); Richard Wenman, Braintree Essex (GB)

(73) Assignee: The Vitec Group Plc, Richmond (GB)

( * ) Notice: Subject to any disclaimer, the term of this patent is extended or adjusted under 35 U.S.C. 154(b) by 213 days.

(21) Appl. No.: 15/516,594

(22) PCT Filed: Jul. 15, 2015

(86) PCT No.: PCT/GB2015/052032
§ 371 (c)(1),
(2) Date: Apr. 3, 2017

(87) PCT Pub. No.: WO2016/051128
PCT Pub. Date: Apr. 7, 2016

(65) Prior Publication Data
US 2017/0276898 A1 Sep. 28, 2017

(30) Foreign Application Priority Data
Oct. 3, 2014 (GB) .................................. 1417543.4

(51) Int. Cl.
*G02B 7/04* (2006.01)
*G03B 13/32* (2006.01)
*G03B 17/56* (2006.01)
*G03B 3/02* (2006.01)

(52) U.S. Cl.
CPC ................ *G02B 7/04* (2013.01); *G03B 3/02* (2013.01); *G03B 13/32* (2013.01); *G03B 17/56* (2013.01)

(58) Field of Classification Search
CPC ............ G03B 7/04; G03B 13/32; G02B 7/04
USPC ........................................................ 396/72
See application file for complete search history.

(56) References Cited

U.S. PATENT DOCUMENTS 3,567,317 A * 3/1971 Plummer ................ G03B 3/02
352/139

FOREIGN PATENT DOCUMENTS

| | | | |
|---|---|---|---|
| DE | 19534762 | A1 | 3/1996 |
| DE | 202012012442 | U1 | 4/2013 |
| GB | 1365248 | A | 8/1974 |
| GB | 2392214 | A | 2/2004 |
| JP | H09189834 | A | 7/1997 |
| JP | 2002107606 | A | 4/2002 |
| JP | 2004163484 | | 6/2004 |

(Continued)

OTHER PUBLICATIONS

Anonymous: "Continuously Variable Transmission—Wikipedia, the free encyclopedia", Sep. 2015.

*Primary Examiner* — Christopher E Mahoney

(57) ABSTRACT

A focus control device is adapted to adjust a camera lens. The device comprises a rotational input device (1), a variable gear ratio means (10) and a rotational output means so coupled to communicate a first rotational movement applied to said rotational input device to said variable gear ratio means (10) and to communicate a second rotational movement from said variable gear ratio means (10) to said rotational output means. The variable gear ratio means provides a variable adjustment of the angular velocity of said second rotational movement relative to the angular velocity of said first rotational movement.

24 Claims, 5 Drawing Sheets

(56) References Cited

FOREIGN PATENT DOCUMENTS

| | | | |
|---|---|---|---|
| JP | 2004078078 | A | 3/2011 |
| WO | 2014/030527 | A1 | 2/2014 |

* cited by examiner

MANUAL FOCUS CONTROL DEVICE

CROSS REFERENCE TO RELATED APPLICATIONS

This application is a National Phase of PCT Patent Application No. PCT/GB2015/052032 filed Jul. 15, 2015, which claims priority to Great Britain Application No. 1417543.4 filed Oct. 3, 2014, which is incorporated herein by reference in its entirety.

FIELD OF THE INVENTION

The invention relates to a focus control device, and in particular to a lens focus follower device, and further to a manually operated control device.

BACKGROUND TO THE INVENTION

It is well known in the film industry to have a camera rig consisting of a camera, lens and various other accessories. Typically camera lenses have a focus ring on them that can be turned to adjust the focus of the lens. When the camera rig is in use it can be difficult to access this focus ring and to turn it smoothly, for this reason a device known as a follow focus is often connected to the lens.

A follow focus device typically has a hand wheel that would be positioned on one side of the camera rig, which allows the operator to easily access and rotate the hand wheel. The rotation of the hand wheel is transmitted through the follow focus via a fixed ratio gear train to a final drive roller. The final drive roller will be positioned so that it is in contact with the focus ring of the lens and so will turn the focus ring in proportion to the amount that the user rotates the hand wheel on the follow focus.

The focus ring on the lens typically has gear teeth on it and the final drive roller has matching gear teeth. Because the gear tooth form on the focus rings varies between different lenses it is normal for the final drive roller of the follow focus to be detachable from the follow focus so that different final drive rollers can be used to match the tooth form of the particular lens that is being used. By selecting a final drive roller with the correct tooth form for the lens but greater or fewer teeth it is possible for the user to alter the gear ratio between the hand wheel on the follow focus and the focus ring on the lens. This has the effect of changing the "sensitivity" of the focus ring on the lens to movements of the hand wheel on the follow focus, thus making it easier to either achieve a fast movement from one position to another or giving the user finer control of the position of the lens' focus ring. However changing the final drive gear can only be done when building up the camera rig and cannot then be easily altered between users of the camera rig. Also it means that the operator needs a large number of final drive rollers in order to ensure they have one that will match the tooth form on the focus ring of the lens and give a suitable gear ratio between the hand wheel of the follow focus and the focus ring of the lens.

Because the operator needs extremely good control of the focus ring on the lens it is important that the drive train of the follow focus have zero backlash.

In order to achieve a smooth adjustment of the focus the operator must turn the focus ring at a constant rotational velocity. Due to tolerances and potentially variable mechanical advantage in the drive mechanisms with in the lens itself the torque required to rotate the focus ring varies as it is rotated. This means the operator must match the torque they are applying to the hand wheel to a variable torque requirement in order to maintain a constant velocity. This is a difficult if not impossible task.

Although motor driven solutions to the above outlined problems have been proposed, the current invention seeks to provide a manually operated solution, not reliant on a power supply or motor in order to function. Moreover, the invention can be added to a camera or lens unit as an external add-on focus control device, or retrofit to existing equipment if so desired.

SUMMARY OF THE INVENTION

In a first broad independent aspect, the invention provides a manual focus control device adapted to adjust a camera lens comprising a rotational input device, a variable gear ratio means and a rotational output means so coupled to communicate a first rotational movement applied from said rotational input device to said variable gear ratio means and to communicate a second rotational movement from said variable gear ratio means to said rotational output means; characterised in that said variable gear ratio means provides a variable adjustment of the angular velocity of said second rotational movement relative to the angular velocity of said first rotational movement.

This configuration enables the adjustment of the angular velocity of the rotational output means which then subsequently drives the focus ring of the lens. The adjustment of angular velocity can be achieved by simply adjusting the gear ratio within the variable gear ratio means, without having to physically replace individual gears. Thus the sensitivity of the focus ring on the lens to the movements of a rotational input device such as a hand wheel can be changed.

Preferably, said variable gear ratio means is an infinitely variable gear ratio means. This configuration enables the angular velocity relationship between input and output means to be varied without being limited to any predetermined gear ratio within its functional range.

Preferably, said variable gear ratio means further comprises a first gear arranged on a first shaft which is coupled to said rotational input device; whereby said first gear comprises a first variable radius means. This configuration provides the radial adjustment of the first gear, which subsequently provides a means of adjusting the velocity of the communication means between the first gear and second gear.

Preferably, said variable gear ratio means further comprises a second gear arranged on a second shaft which is coupled with said rotational output device; whereby said second gear comprises a second variable radius means. This configuration provides the radial adjustment of the second gear, which subsequently provides a means of adjusting the angular velocity of the second rotational movement.

Preferably, said variable gear ratio means further comprising a belt located about said first gear and said second gear, which in use, communicates a third rotational movement from said first gear to said second gear. This configuration communicates the angular velocity from the first gear to the second gear of the variable gear ratio means.

Preferably, said belt is a 'V' belt. This configuration prevents the belt from becoming separated from either the first gear or second gear of the variable gear ratio means Preferably, said first variable radius means further comprises a first conical roller and a second conical roller arranged on said first shaft, whereby the diameter of said first conical rollers is reduced in a direction towards said second conical roller; and said second conical roller is reduced in a direction towards said first conical roller. This configuration enables the first variable radius means to accommodate and cooperate with the side surfaces of a 'V' drive belt.

Preferably, the position of said second conical roller is adjustable along said first shaft relative to said first conical roller. This configuration provides the adjustment of the overall diameter of the first variable radius means. The positioning of the second conical roller away from the first conical roller increases the gap between the first and second conical rollers. Therefore, causing the 'V' belt to be displaced towards the first shaft, this reduces the radius of the belt about the first shaft and effectively reduces the overall diameter of the first variable radius means. Or alternatively, the positioning of the second conical roller towards the first conical roller decreases the size of the gap between the first and second conical rollers. Therefore, causing the 'V' belt to be displaced away from the first shaft, this increases the radius of the belt about the first shaft and effectively increases the overall diameter of the first variable radius means.

Preferably, said first and second conical rollers are pulled together via a first resilient spring member. This configuration enables the inclined inner surfaces of both the first conical roller and second conical roller to be biased towards each other, and therefore abut the side surfaces of a 'V' belt.

Preferably, said second variable radius means further comprises a third conical roller and a fourth conical roller arranged on said second shaft, whereby the diameter of said third conical rollers is reduced in a direction towards said fourth conical roller; and said fourth conical roller is reduced in a direction towards said third conical roller. This configuration enables the second variable radius means to accommodate and cooperate with the side surfaces of a 'V' drive belt.

Preferably, said fourth conical roller is adjustable along said second shaft relative to said third conical roller. This configuration provides the adjustment of the overall diameter of the second variable radius means. The positioning of the fourth conical roller away from the third conical roller increases the gap between the third and fourth conical rollers. Therefore, causing the 'V' belt to be displaced towards the second shaft, this reduces the radius of the belt about the second shaft and effectively reduces the overall diameter of the second variable radius means. Or alternatively, the positioning of the fourth conical roller towards the third conical roller decreases the size of the gap between the third and fourth conical rollers. Therefore, causing the 'V' belt to be displaced away from the second shaft, this increases the radius of the belt about the second shaft and effectively increases the overall diameter of the second variable radius means.

Preferably, said third and fourth conical rollers are pulled together via a second resilient spring member. This configuration enables the inclined inner surfaces of both the third conical roller and fourth conical roller to be biased towards each other, and therefore abut the side surfaces of a 'V' belt.

Preferably, a focus control device further comprises a position indicator arranged on the output of said focus control device. This configuration provides an indication of the angular displacement of the output from the focus control device.

Preferably, a focus control device further comprises a position indicator arranged on the output of the variable gear ratio means. This configuration provides an indication of the angular displacement of the output from the variable gear ratio means.

Preferably, a focus control device further comprises a position indicator arranged on the input of the variable gear ratio means. This configuration provides an indication of the angular displacement of the input of the variable gear ratio means.

Preferably, said rotational input device further comprises a first adjustable stop element which cooperates with said position indicator when said position indicator moves in a first direction.

This configuration prevents the input of the rotational input device from rotating beyond a selectable angular displacement in first direction (e.g. a clockwise or anticlockwise direction); therefore preventing the rotational input device to be turned beyond a first selected predetermined point.

Preferably, a focus control device further comprises a second adjustable stop element which cooperates with said position indicator when said position indicator moves in a second direction. This configuration prevents the input of the rotational input device from rotating beyond a selectable angular displacement in second a direction, which is typically at 90 degrees to the input; therefore preventing the rotational input device to be turned beyond a second selected predetermined point.

Preferably, a focus control device further comprising a third adjustable stop element located between the output of said variable gear ratio means and the input of said rotational output means. This configuration prevents the output of the variable gear ratio means to rotate beyond a selectable angular displacement; therefore preventing the driving of an attached lens unit beyond a selected predetermined point.

Preferably, a focus control device further comprising a drag means located between the output of said rotational input device and the input of said variable gear ratio means. This configuration provides a resistive force to the input of the rotational input device.

Preferably, a focus control device further comprising a drag means located between the output of said variable gear ratio means and the input to said rotational output means. This configuration provides a resistive force to the output of the variable gear ratio means.

Preferably, said drag means provides an adjustable resistance to the rotational movement communicated from said rotational input device to said variable gear ratio means. This configuration provides an adjustable resistive force to the output of the rotational input device.

Preferably, said drag means further comprises a fluid shearing means for providing said resistance. This configuration provides a smooth and simple resistive force against a rotational input to the drag means.

Preferably, said drag means further comprises a lubricated friction means for providing said resistance. This configuration provides an alternative means of resistance, which is simple and cheap to manufacture when compared to other fluid shear drag means.

Preferably, a lens comprising a focus control device according to any of the above features.

Preferably, a camera comprising a focus control device according to any of the above features.

In a second broad independent aspect, the invention provides a focus control device adapted to adjust a camera lens comprising a rotational input device, a gear ratio means and a rotational output means so coupled to communicate a first rotational movement applied to said rotational input device to said gear ratio means and to communicate a second rotational movement from said gear ratio means to said rotational output means; characterised in that said focus control device further comprises drag means located between the output of said rotational input device and the input of said variable gear ratio means.

This configuration provides a resistive force between the rotational input device, such as a hand wheel to the rotational output means, such as a drive shaft for driving the helical gears, which then subsequently drives the focus ring of the lens.

Preferably, said gear ratio means comprises a fixed gear ratio. This configuration ensures the angular velocity is fixed to a predetermined gear ratio.

Preferably, a focus control device further comprises a second fixed gear ratio; whereby said fixed gear and said second fixed gear are selectable. This configuration enables the angular velocity to be selectable from two predetermined gear ratios.

Preferably, said drag means is located between the output of said gear ratio means and the input to said rotational output means. This configuration provides a resistive force to the output of the gear ratio means.

Preferably, said drag means provides an adjustable resistance to the rotational movement communicated from said rotational input device to said gear ratio means. This configuration provides an adjustable resistive force to the output of the rotational input device.

Preferably, said drag means further comprises a fluid shearing means for providing said resistance. This configuration provides a smooth and simple resistive force against a rotational input to the drag means.

Preferably, said drag means further comprises a lubricated friction means for providing said resistance. This configuration provides an alternative means of resistance, which is cheaper to manufacture.

DETAILED DESCRIPTION OF THE FIGURES

Figure 1:
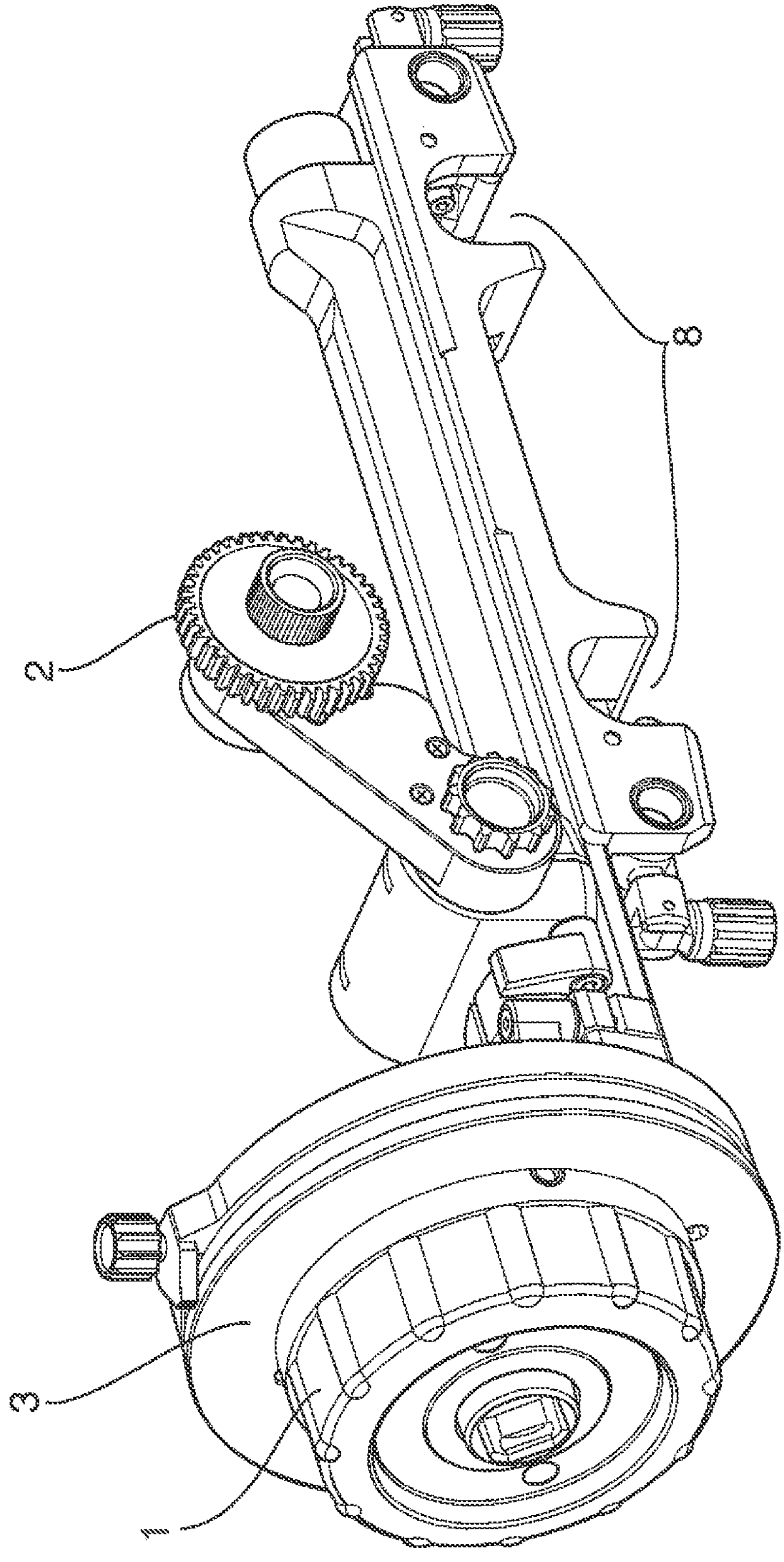
FIG. 1 is an isometric view of a current follow focus.
Figure 2:
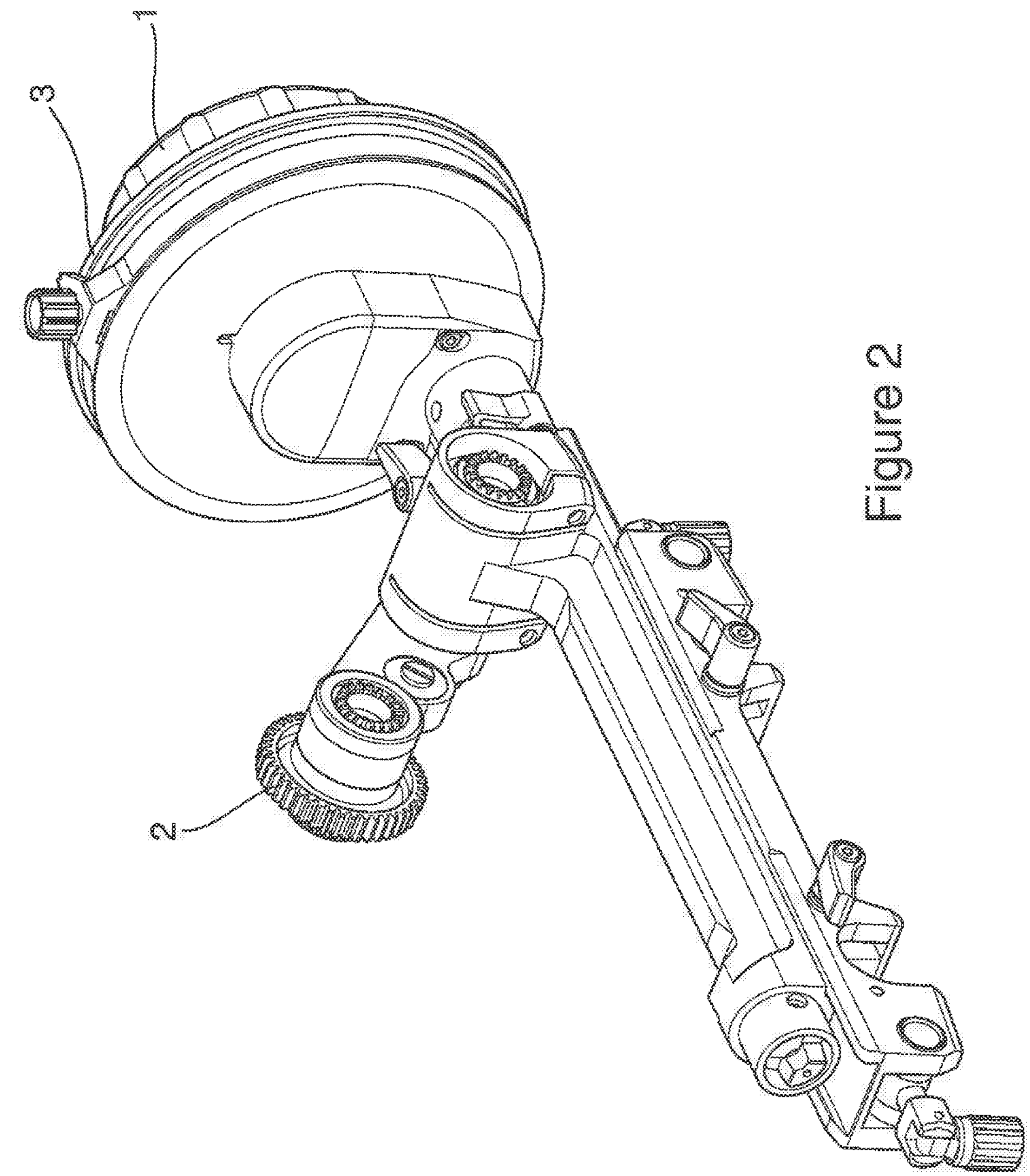
FIG. 2 is a second isometric view of the same current follow focus from the opposite point of view.

FIGS. 1 and 2 show a current follow focus having a hand wheel (1) which is connected to a final drive roller (2) via a fixed gear ratio (not shown as it is internal to the follow focus), a position indicator (3) that is connected to the hand wheel (1) and a bracket with a pair of slots (8) that are used to mount the follow focus to a camera rig. The position indicator (3) is intended to be a visual indicator and also in a preferred embodiment readily markable by a user to enable a user to move away from a focus position and subsequently return thereto. In one embodiment, as illustrated, the indicator can be a disc, markable by a conventional pencil or the like. This feature, along with the indicator being separate from the camera and lens allows for the fact that any focus or zoom indication of a particular lens position on the input changes whenever the variable ratio drive is changed. The indicator on the output of a variable drive would stay the same but is less sensitive, and so less accurate for high drive ratios.

Figure 3:
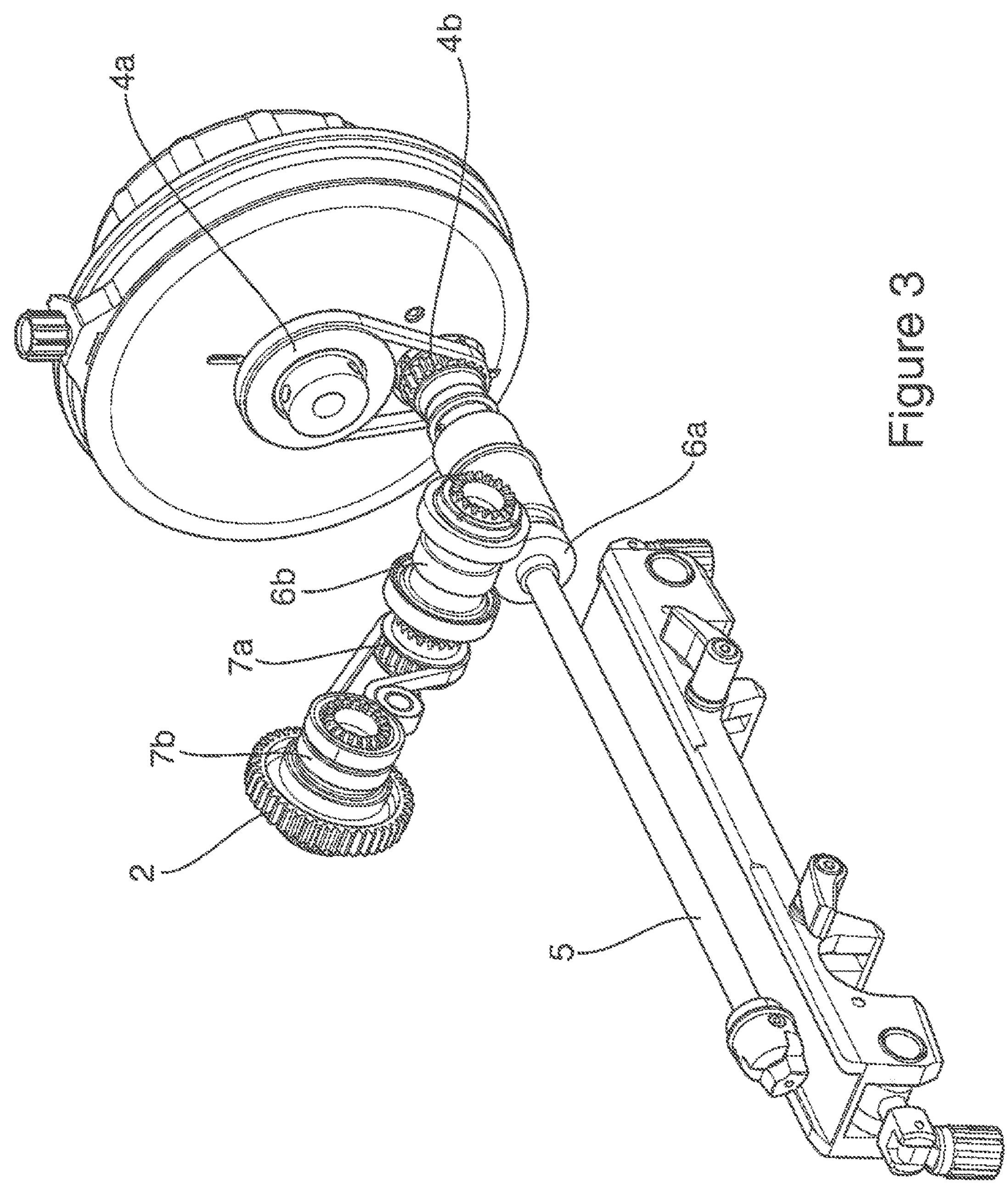
FIG. 3 is the same follow focus as in FIG. 2 and from the same angle as in FIG. 2 but with the case work removed to show internal details of the drive train.

FIG. 3 shows the same follow focus as in FIGS. 1 and 2 but with the covers removed so the drive system used in this follow focus can be seen. The drive system consists of;

a fixed ratio belt drive consisting of a larger pulley (4*a*) that is connected to, and turns with the hand wheel (1) and a smaller pulley (4*b*) that is connected to and turns with a drive shaft (5);

a fixed ratio pair of helical gears consisting of a first helical gear (6*a*) that is connected to and turns with drive shaft (5) and a second helical gear (6*b*). The helical gears are used to turn the drive through 90 degrees so it now rotates about an axis parallel to the lens.

The drive system also includes a fixed ratio belt drive consisting of a first pulley (7*a*) which is connected to and turns with second helical gear (6*b*) and a second pulley (7*b*) which is connected to and turns with the final drive roller (2).

Figure 4:
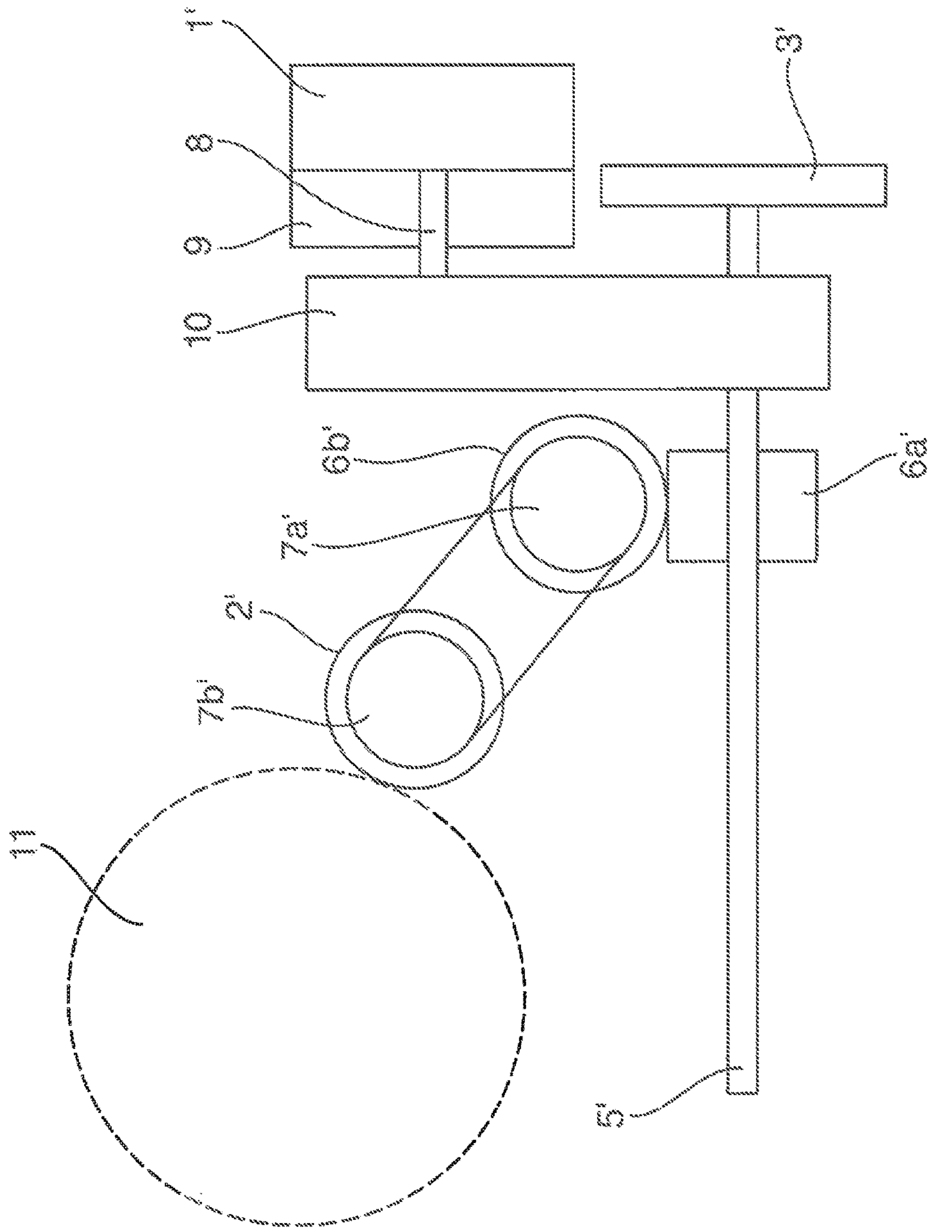
FIG. 4 is a block diagram of the invention.

FIG. 4 shows a schematic diagram of the follow focus invention. For clarity, items that are substantially the same as those in the current focus use the same number suffixed with an apostrophe. The follow focus consists of;

a hand wheel (1') that is connected and turns with a first drive shaft (8);

a drag unit (9) that is connected to the hand wheel, whereby the drag unit produces a resistive force to the movement of the hand wheel, the resistive force being linked to the angular velocity of the hand wheel;

a variable ratio drive element (10) takes in the rotation on first drive shaft (8) and outputs a rotation on a second drive shaft (5'). The variable drive train has a velocity ratio so that the angular velocity of the second drive shaft (5') is X times that of the angular velocity of the first drive shaft (8). The variable drive train is constructed so that the user can change this value X.

a fixed ratio pair of helical gears consisting of a first helical gear (6*a*') that is connected to and turns with the second drive shaft (5') and a second helical gear (6*b*'). The helical gears are used to turn the drive through 90 degrees so it now rotates about an axis parallel to the lens.

The follow focus also includes a fixed ratio belt drive consisting of a first pulley (7*a*') which is connected to and turns with second helical gear (6*b*') and a second pulley (7*b*') which is connected to and turns with the final drive roller (2').

The final drive roller (2') is in contact with the focus ring (11) of the lens and so drives this focus ring (11) with a fixed gear ratio. The focus ring (11) is part of the lens and not strictly part of the follow focus so is shown with a dotted line.

A position indicator (3') is connected to the second drive shaft (5') and indicates the rotational displacement of the second drive shaft (5'). Because the gear ratio between the second drive shaft (5') and focus ring (11) is fixed the angular displacement shown by the position indicator (3') is proportional to that of the focus ring (11). So the position indicator (3') provides a direct indication of the angular displacement of the focus ring (11).

In addition the position indicator (3') could incorporate one or more adjustable hard stops these stops can be moved to a position and locked in place by the user. They then stop the position indicator (3') from rotating past this point; thus limiting the rotation of the focus ring (11) beyond this point. This allows the user to carry out variation of the focus with a high degree of repeatability by;

1. a use of the hand wheel (1) on the follow focus to adjust the focus ring (11) on the lens to a certain rotational displacement that gives the correct focus,
2. setting the adjustable hard stop on the position indicator (3') to the current position.
3. using the hand wheel (1) on the follow the focus to move focus ring (11) to a different rotational displacement,
4. then rapidly rotate the hand wheel (1) of the follow focus back until the position indicator (3') hits the hard stop preventing further rotation. The focus ring (11) will now be back at the original rotational displacement that gave the correct focus.

Figure 6:
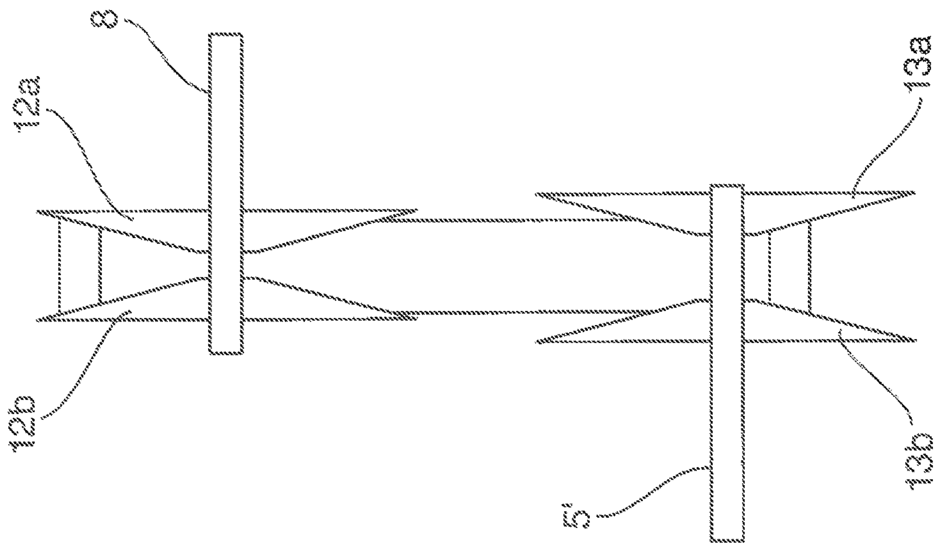
FIG. 6 shows the same variable ratio drive train as FIG. 5 but at the opposite extreme of its adjustment.
Figure 5:
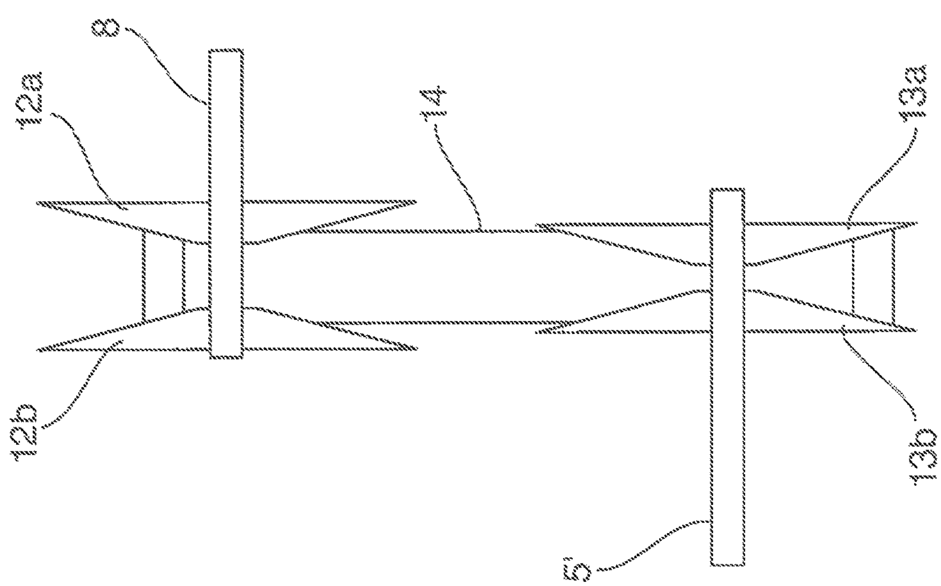
FIG. 5 shows a possible variable ratio drive train at one extreme of its adjustment.

FIGS. 5 and 6 show an embodiment of the variable ratio drive element (10), which comprises a first pair of conical rollers (12*a*) and (12*b*) that are mounted so that they rotate with drive shaft (8) but can move along the first drive shaft (8). A second pair of conical rollers (13*a*) and (13*b*) are mounted so that they rotate with second drive shaft (5') but can move along the drive shaft (5'). A V belt (14) sits between the first pair of conical rollers (12*a*), (12*b*) and the second pair of conical rollers (13*a*) and (13*b*).

By allowing the user to control the gap between one pair of the conical rollers the radius at which the belt (14) sits relative to the corresponding shaft can be controlled. The belt (14) can be tensioned by spring loading the other pair of conical rollers to adjust the spacing therebetween, so that the spacing will automatically reduce, forcing the belt (14) out to a larger radius from the corresponding shaft. Because the radius of the belt (14) around the first drive shaft (8) and the radius of the belt (14) around second drive shaft (5') has been altered, the gear ratio of the drive has changed, so the user can effectively control the gear ratio of the drive train. Because the gear ratio is varied by controlling the spacing between the rollers the user can set the gear ratio to any value between the maximum and minimum gear ratio that the drive train is capable of, this ability is referred to as an infinitely variable gear ratio. For example let us assume the user can control the spacing between conical rollers (13*a*) and (13*b*) and that conical rollers (12*a*) and (12*b*) are sprung together.

In FIG. 5 the user has set conical rollers (13*a*) and (13*b*) close together pushing the belt (14) out to a large radius around the second drive shaft (5'). This means a large amount of belt (14) is used in wrapping around conical rollers (13*a*) and (13*b*). This leaves only a small amount of belt (14) to wrap around conical rollers (12*a*) and (12*b*) forcing the belt (14) to come down to a small radius around the first drive shaft (8). The spacing between conical rollers (12*a*) and (12*b*) is thereby forced to increase. Due to the different radius of the belt (14) around first drive shaft (8) and second drive shaft (5') the first drive shaft (8) will have to complete several rotations for each rotation of the second drive shaft (5').

In FIG. 6 the user has set conical rollers (13*a*) and (13*b*) far apart. This allows the belt (14) to slip down between the rollers so that it is at a small radius around the second drive shaft (5'). This means a small amount of belt (14) is used in wrapping around conical rollers (13*a*) and (13*b*). This leaves a large amount of belt (14) to wrap around conical rollers (12*a*) and (12*b*). Because conical rollers (12*a*) and (12*b*) are sprung loaded they are forced together pushing the belt (14) out to a large radius relative to first drive shaft (8). Due to the different radius of the belt (14) around first drive shaft (8) and second drive shaft (5') the first drive shaft (8) will have to complete only a portion of a rotation for each rotation of the second drive shaft (5') so the gear ratio has changed from when the drive was in the configuration shown in FIG. 5.

It is seen from FIGS. 5 and 6, that in a preferred embodiment the conical rollers (12*a*, 12*b*) on the first drive shaft are orientated towards each other such that the diameter of each of the rollers reduces in the direction of the other roller. A similar configuration is also shown in the conical rollers (13*a*, 13*b*) on the second drive shaft.

The same effect could be achieved by allowing the user to control the spacing between conical rollers (12*a*) and (12*b*) and having conical rollers (13*a*) and (13*b*) sprung together.

In an alternative embodiment of the invention, the drag unit (9) could be located subsequent to the variable ratio drive element (10). This would produce a resistive force to rotation of the focus ring (11), whereby the resistive force is linked to the angular velocity of the focus ring (11).

The advantages of the follow focus are:

Quick and easy to adjust the "sensitivity" of the follow focus by changing the gear ratio between the hand wheel of the follow focus and the focus ring of the lens.

Infinitely adjustable gear ratio rather than discreet steps.

Only need one final drive roller which matches the tooth form of the focus ring on the lens.

Stop marks do not need resetting when gear ratio is changed.

Adjustable physical stops do not need resetting when gear ratio is changed.

Uses belts giving zero backlash drive with minimal cost

In another alternative embodiment of the invention, the variable ratio drive element (10) is replaced with a fixed gear ratio drive element, which takes in the rotation on first drive shaft (8) and outputs a rotation on a second drive shaft (5'). Whereby, the angular velocity of the second drive shaft is X times that of the angular velocity of the first drive shaft (8). The drive train is constructed so that this value X is fixed and therefore the angular velocity of the second drive shaft is therefore not adjustable.

In another embodiment of the invention, the drive train incorporates a gear ratio drive element comprising a stepped variable gear ratio (e.g. "coarse" and "fine" for 2 ratios; or 3 or more selectable gear ratios within the gear box, if required.

The features of the follow focus device are set out as follows:

1. A follow focus including:
   a. a user input device such as a hand wheel, lever or other component;
   b. a variable gear ratio system; and
   c. an interface that transmits the drive to the lens.
2. As point 1 with an infinitely variable gear ratio system.
3. As point 2 with the infinitely variable gear ratio system being provided by a V belt and conical pulley arrangement as per FIGS. 5 and 6.
4. As point 1 with a position indicator being provided to indicate rotation of the hand wheel or the drive to the lens.
5. As point 4 with the position indicator being provided after the variable gear ratio system so indicating rotation of the drive to the lens.
6. As point 4 with the position indicator being provided before the variable gear ratio system so indicating rotation of the user input device.
7. As point 1 with one or more adjustable physical stop being provided to stop rotation of the hand wheel or the drive to the lens beyond a user defined point.

8. As point 7 with one or more adjustable physical stop being provided before the variable gear ratio system to stop rotation when the hand wheel gets to a certain position.
9. As point 7 with one or more adjustable physical stop being provided after the variable gear ratio system to stop rotation when the user input device gets to a certain position.
10. A follow focus including:
    a. a user input device such as a hand wheel, lever or other component;
    b. a drag unit that produces a resisting torque that is related to the speed of rotational movement; and
    c. an interface that transmits the drive to the lens.
11. As point 10 where the amount of drag is adjustable by the user so that it will produce more or less resistance in response to the same angular velocity.
12. As point 10 with the drag being provided by shearing fluid.
13. As point 10 with the drag being provided by lubricated fiction.
14. As points 1 and 10 with the drag unit positioned between the user input device and the variable gear ratio system so that the resisting torque is related to the rotational velocity of the user input device.
15. As points 1 and 10 with the drag unit positioned between the variable gear ratio system and the drive to the lens so that the resisting torque is related to the rotational velocity of the drive to the lens.

The invention claimed is:

1. A manual focus control device comprising a lens adjustment mechanism adapted to drive a focus ring of a camera lens, the lens adjustment mechanism comprising a rotational input device, a variable gear ratio system, and a rotational output system coupled to communicate a first rotational movement applied from said rotational input device to said variable gear ratio system and to communicate a second rotational movement from said variable gear ratio system to said rotational output system, wherein said variable gear ratio system is an infinitely variable gear ratio system and provides a variable adjustment of an angular velocity of said second rotational movement relative to an angular velocity of said first rotational movement.

2. A device according to claim 1, wherein said variable gear ratio system further comprises a first gear arranged on a first shaft which is coupled to said rotational input device, wherein said first gear comprises a first variable radius system.

3. A device according to claim 2, wherein said variable gear ratio system further comprises a second gear arranged on a second shaft which is coupled with said rotational output device; whereby said second gear comprises a second variable radius system.

4. A device according to claim 3, wherein said variable gear ratio system further comprises a belt located about said first gear and said second gear, which in use, communicates a third rotational movement from said first gear to said second gear.

5. A device according to claim 4, wherein said belt is a ‘V’ belt.

6. A device according to claim 3, wherein said second variable radius system further comprises a third conical roller and a fourth conical roller arranged on said second shaft, wherein the diameter of said third conical roller is reduced in a direction towards said fourth conical roller; and said fourth conical roller is reduced in a direction towards said third conical roller.

7. A device according to claim 6, wherein said fourth conical roller is adjustable along said second shaft relative to said third conical roller.

8. A device according to claim 6, wherein said third and fourth conical rollers are pulled together via a second resilient spring member.

9. A device according to claim 2, wherein said first variable radius system further comprises a first conical roller and a second conical roller arranged on said first shaft, wherein the diameter of said first conical roller is reduced in a direction towards said second conical roller; and said second conical roller is reduced in a direction towards said first conical roller.

10. A device according to claim 9, wherein the position of said second conical roller is adjustable along said first shaft relative to said first conical roller.

11. A device according to claim 9, wherein said first and second conical rollers are pulled together via a first resilient spring member.

12. A device according to claim 1, further comprising a position indicator arranged on the output of said rotational input device.

13. A device according to claim 1, further comprising a position indicator arranged on the output of the variable gear ratio system.

14. A device according to claim 1, further comprising a position indicator arranged on the input of the variable gear ratio system.

15. A device according to claim 1, wherein said rotational input device further comprises a first adjustable stop element which cooperates with a position indicator when said position indicator moves in a first direction.

16. A device according to claim 15, further comprising a second adjustable stop element which cooperates with said position indicator when said position indicator moves in a second direction.

17. A device according to claim 16, further comprising a third adjustable stop element located between the output of said variable gear ratio system and the input of said rotational output system.

18. A device according to claim 1, further comprising a drag system located between the output of said rotational input device and the input of said variable gear ratio system.

19. A device according to claim 18, wherein said drag system provides an adjustable resistance to the rotational movement communicated from said rotational input device to said variable gear ratio system.

20. A device according to claim 19, wherein said drag system further comprises a fluid shearing system for providing said resistance.

21. A device according to claim 20, wherein said drag system further comprises a lubricated friction system for providing said resistance.

22. A device according to claim 1, further comprising a drag system located between the output of said variable gear ratio system and the input to said rotational output system.

23. A lens comprising a focus control device according to claim 1.

24. A camera comprising a focus control device according to claim 1.

* * * * *